(12) United States Patent
Graves et al.

(10) Patent No.: US 10,870,589 B2
(45) Date of Patent: Dec. 22, 2020

(54) FILTERING SYSTEM FOR REMOVING CHEMICALS FROM FLUIDS

(71) Applicants: Jan D. Graves, Norwalk, OH (US); Gregory D. Graves, Milan, OH (US)

(72) Inventors: Jan D. Graves, Norwalk, OH (US); Gregory D. Graves, Milan, OH (US)

( * ) Notice: Subject to any disclaimer, the term of this patent is extended or adjusted under 35 U.S.C. 154(b) by 487 days.

(21) Appl. No.: 15/140,051

(22) Filed: Apr. 27, 2016

(65) Prior Publication Data
US 2017/0313597 A1    Nov. 2, 2017

(51) Int. Cl.
*C02F 1/28* (2006.01)
*C02F 1/52* (2006.01)
(Continued)

(52) U.S. Cl.
CPC .......... *C02F 1/281* (2013.01); *B01D 24/165* (2013.01); *C02F 1/001* (2013.01); *C02F 1/006* (2013.01);
(Continued)

(58) Field of Classification Search
CPC .......... C02F 1/001; C02F 1/004; C02F 1/006; C02F 2001/007; C02F 1/281; C02F 1/288; C02F 1/5245; C02F 2101/105; C02F 2303/16; C02F 1/283; C02F 2103/001; C02F 2103/007; B01D 24/165; B01J 20/08; B01J 20/28004; B01J 20/28019; B01J 20/28061
(Continued)

(56) References Cited

U.S. PATENT DOCUMENTS 3,558,508 A * 1/1971 Keith et al. ................ B01J 2/08
502/8
3,788,982 A  1/1974 Zsoldos et al.
(Continued)

FOREIGN PATENT DOCUMENTS

AU  199227389   4/1993
WO  2014082170   6/2014

OTHER PUBLICATIONS

Checkman Michael Yue, Student Thesis and Dissertation—Removal of phosphate by sorption on activated alumina, 1970, Curtis Laws Willson Library, Missouri University of Science and Technology, 88 pages. (Year: 1970).*
(Continued)

*Primary Examiner* — Matthew O Savage
(74) *Attorney, Agent, or Firm* — Benesch, Friedlander, Coplan & Aronoff LLP

(57) ABSTRACT

A filter system for filtering a fluid stream is disclosed herein. The filter system includes a first fluid passage, a first chamber, a second chamber, an adsorbing media, and a second fluid passage. The first fluid passage is arranged such that a fluid stream can flow through the first fluid passage and into the filter system. The first chamber is arranged to hold suspended or dissolved solids, pollutants, and nutrients that are filtered from the fluid stream. The second chamber is positioned above the first chamber and in fluid communication with the first chamber. The adsorbing media is positioned in the second chamber. The second fluid passage is arranged such that filtered fluid from the fluid stream can flow out of the filtering system through the second fluid passage.

31 Claims, 18 Drawing Sheets

(51) Int. Cl.
*C02F 1/00* (2006.01)
*B01D 24/16* (2006.01)
*B01J 20/28* (2006.01)
*C02F 103/00* (2006.01)
*B01J 20/08* (2006.01)
*C02F 101/10* (2006.01)

(52) U.S. Cl.
CPC .............. *C02F 1/283* (2013.01); *C02F 1/288* (2013.01); *C02F 1/5245* (2013.01); *B01J 20/08* (2013.01); *B01J 20/28004* (2013.01); *B01J 20/28019* (2013.01); *B01J 20/28061* (2013.01); *C02F 2001/007* (2013.01); *C02F 2101/105* (2013.01); *C02F 2103/001* (2013.01); *C02F 2103/007* (2013.01); *C02F 2303/16* (2013.01)

(58) Field of Classification Search
USPC ........................................................ 210/290
See application file for complete search history.

(56) References Cited

U.S. PATENT DOCUMENTS

| | | | | |
|---|---|---|---|---|
| 3,950,252 A * | 4/1976 | Jordan | ...................... | E03F 5/14 210/281 |
| 4,139,473 A * | 2/1979 | Alldredge | ............. | B01D 24/008 210/279 |
| 4,591,437 A * | 5/1986 | Ernryd | ............... | B01D 21/0012 210/265 |
| 4,717,483 A * | 1/1988 | Bush | ...................... | C02F 1/281 210/681 |
| 4,755,296 A | 7/1988 | Ying et al. | | |
| 5,118,655 A | 6/1992 | Pedersen | | |
| 5,120,435 A | 6/1992 | Fink | | |
| 5,178,768 A | 1/1993 | White, Jr. | | |
| 5,256,299 A * | 10/1993 | Wang | .................... | B01D 24/002 210/108 |
| 5,271,848 A * | 12/1993 | Smith | ...................... | C02F 1/281 210/702 |
| 5,733,454 A | 3/1998 | Cummings | | |
| 5,871,648 A | 2/1999 | Allen et al. | | |
| 6,361,695 B1 * | 3/2002 | Husain | .................... | B01D 61/16 210/195.2 |
| 2003/0094407 A1 | 5/2003 | De Ridder et al. | | |
| 2003/0217954 A1 | 11/2003 | Towndrow | | |
| 2010/0243571 A1 | 9/2010 | Semiat et al. | | |
| 2011/0062084 A1 | 3/2011 | Liao et al. | | |
| 2011/0163022 A1 | 7/2011 | Kolesnikov | | |
| 2011/0303609 A1 * | 12/2011 | Isovitsch Parks | ... | B01J 20/0229 210/663 |
| 2012/0264591 A1 * | 10/2012 | Penn | ...................... | C02F 1/281 502/22 |
| 2013/0175216 A1 | 7/2013 | Ma et al. | | |
| 2014/0076800 A1 * | 3/2014 | Graves | ...................... | C02F 9/00 210/605 |

OTHER PUBLICATIONS

"Phosphorus Treatment and Removal Technologies," Minnesota Pollution Control Agency, Municipal Division, Wastewater Program, Jun. 2006, pp. 1-5.

* cited by examiner

FILTERING SYSTEM FOR REMOVING CHEMICALS FROM FLUIDS

FIELD OF INVENTION

The present disclosure is directed to methods and apparatus for removing chemicals or other substances from fluids, and more specifically, the present disclosure is directed to methods and apparatus using filtering media for removing chemicals from fluid streams such as using activated alumina, activated carbon, ceramic particulate media, or similar material to remove phosphorus from fluid streams as part of the treatment of wastewater; industrial, agricultural, and residential surface runoff; stormwater, and other such fluid streams.

BACKGROUND

Algae growth in natural occurring bodies of water such as lakes, ponds, and lagoons is becoming increasingly problematic. Such algae growth includes increases in blue-green, red, yellow, and brown algae. Excess algae in a body of water can cause surface scum, noxious odors, and, if the body of water serves as a source of drinking water, can negatively affect the taste and/or toxicity of the drinking water. Algae growth increases the biological oxygen demand (BOD) in the body of water. Since any body of water can hold only a given amount of dissolved oxygen, an increase in the BOD created by the growth of algae can deprive other biological organisms native to the body of water the oxygen required for those native organisms to survive. Thus, the ecological balance of the body of water can be altered by the growth of algae. Additionally, the amount and rate of decomposition of biological materials in the body of water can increase dramatically when the body of water experiences a sharp growth of algae, resulting in a decrease in the quality of water.

One circumstance that can cause the growth of algae in bodies of water is an increase in the levels of certain chemicals that serve as nutrients for algae. For example, an increase in phosphorus can provide additional nutrients to increase the amount of algae in the body of water. Phosphorus can enter bodies of water from a number of sources. For example, increases in phosphorus can originate from sources such as from effluent exiting a sewage treatment plant into the body of water; surface runoff from industrial, agricultural, or residential lands due to the use of the land or accumulation of rain water entering proximate bodies of water; or stormwater collected in storm drains and other such drainage systems and directed into bodies of water. In one specific example, fertilizers used to improve the growing condition of farm fields and residential lawns and gardens can include phosphorus levels in those fields, lawns, and gardens. When rain runoff or irrigation runoff from these lands are channeled into an adjoining body of water, the phosphorus level in that body of water can increase substantially. In another example, septic tanks and associated leach fields used for local sewage control can increase the phosphorus level in bodies of water through runoff and underground movement of water.

One common method of addressing the problem of increased phosphorus is to attempt to remove phosphorus from treated sewage, runoff water, and other sources of phosphorus entering bodies of water. Coagulation and adsorption processes are two such methods for removing phosphorus from sewage and other fluid flows. However, coagulation processes produce chemical sludge as a byproduct of the process. Chemical sludge often contains aluminum, which can require separate and specialized treatment or can require disposal in a landfill. Such a byproduct and need for additional treatment limits the effectiveness of coagulation processes. Conventional adsorbent media have relativity low phosphorus adsorption capacities, which limit the effectiveness of the adsorbent processes. Additionally, conventional adsorption processes also result in byproducts. For example, upon the exhaustion of current adsorbent media, it is often necessary to treat the adsorbent media or dispose of the adsorbent media in a specialized manner. Thus, current adsorbent media can cause new environmental problems upon its exhaustion as an adsorbent. In one example, upon the exhaustion of a certain adsorbent material, the pH of the treated effluent from an adsorption column is over 9, which is unacceptably high because such levels do not meet government regulatory discharge limits for sewage treatment plants.

There is a need for novel methods and apparatus to treat fluids such as wastewater, industrial, agricultural, and residential surface runoff; stormwater, and other such fluid streams to remove chemicals such as phosphorus from such fluids prior to allowing such fluids to flow into bodies of water such as rivers, lakes, ponds, and lagoons.

SUMMARY

A filter system for filtering a fluid stream is disclosed herein. The filter system includes a first fluid passage, a first chamber, a second chamber, an adsorbing media, and a second fluid passage. The first fluid passage is arranged such that a fluid stream can flow through the first fluid passage and into the filter system. The first chamber is arranged to hold suspended or dissolved solids that are filtered from the fluid stream. The second chamber is positioned above the first chamber and in fluid communication with the first chamber. The adsorbing media is positioned in the second chamber. The second fluid passage is arranged such that filtered fluid from the fluid stream can flow out of the filtering system through the second fluid passage.

Also disclosed herein is a method for filtering a fluid stream. The method includes the steps of providing a housing in which to treat the fluid stream, providing a first fluid passage through which the fluid stream can enter the housing, providing a filtering media to filter suspended or dissolved solids from the fluid stream, providing an adsorbing media for adsorbing undesired chemicals or other substances from the fluid stream, and providing a second fluid passage through which filtered fluid of the fluid stream can flow out of the housing.

In another embodiment disclosed herein, a filtering system includes an influent pipe in fluid communication with an influent chamber. The influent pipe is arranged to direct the flow of fluid into the influent chamber. The filter system further includes a settlement chamber and an adsorbent media chamber. The influent chamber is in fluid communication with the settlement chamber, and the settlement chamber is in fluid communication with the adsorbent media chamber. Adsorbent media such as activated alumina, activated carbon, or ceramic particulate media is positioned within the adsorbent media chamber. An effluent channel is positioned above the adsorbent media chamber and arranged to discharge fluid from the filter system through an effluent pipe.

BRIEF DESCRIPTION OF THE DRAWINGS

In the accompanying drawings, structures are illustrated that, together with the detailed description provided below, describe example embodiments of the claimed invention. Where appropriate, like elements are identified with the same or similar reference numerals. Elements shown as a single component may be replaced with multiple components. Elements shown as multiple components may be replaced with a single component. The drawings may not be to scale. The proportion of certain elements may be exaggerated for the purpose of illustration.

DETAILED DESCRIPTION

Figure 1:
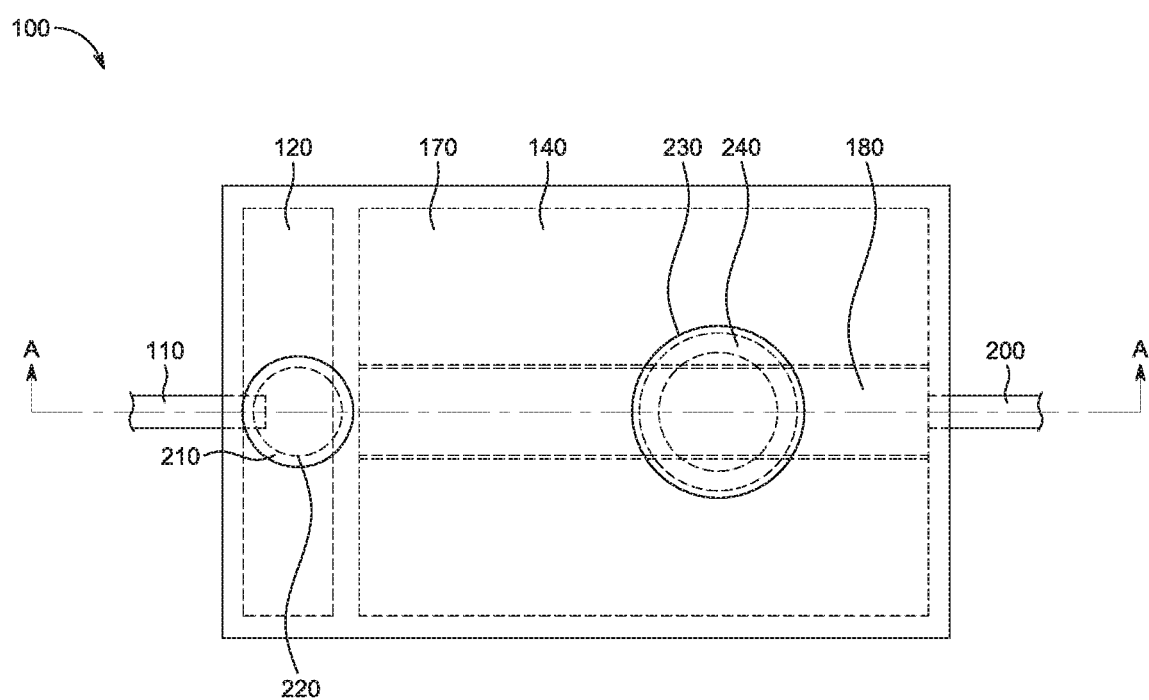
FIG. 1 is a schematic illustration depicting a top view of an embodiment of a filter system in accordance with the disclosure herein.

The systems, arrangements, and methods disclosed in this document are described in detail by way of examples and with reference to the figures. It will be appreciated that modifications to disclosed and described examples, arrangements, configurations, components, elements, apparatus, methods, materials, etc. can be made and may be desired for a specific application. In this disclosure, any identification of specific techniques, arrangements, methods etc. are either related to a specific example presented or are merely a general description of such a technique, arrangement, method, etc. Identifications of specific details or examples are not intended to be and should not be construed as mandatory or limiting unless specifically designated as such. Selected examples of novel systems, arrangements, and methods for using adsorbent media to remove chemicals from fluid streams are hereinafter disclosed and described in detail with reference made to FIGS. 1-18.

Various methods and apparatus are described herein for removing chemicals or other substances from fluids or fluid streams. Exemplary methods and apparatus are described as removing phosphorus from influent to result in effluent with reduced and acceptable levels of phosphorus. Although the examples described herein include removing phosphorus from influent during the treatment of wastewater, it will be understood by those of ordinary skill in the art upon reading and understanding this disclosure that the apparatus and methods described herein can also be used to remove other chemicals or substances from other types of fluid streams. For example, the apparatus and methods described herein can be applicable for treating fresh water, stormwater, industrial runoff, agricultural runoff, residential runoff, process water, or any other fluid stream containing an undesirable chemical or substance. In addition, it will be understood that while the examples provided herein can be standalone methods and systems for treating fluid streams, the examples of systems and methods may also be one of many steps performed in treating fluid streams.

The term "fluid stream" as used herein describes any type of fluid that can be treated or processed to remove chemicals or other substances dissolved in, suspended in, or otherwise comingled with the fluid. Examples of common fluid streams include, but are not limited to, wastewater such as municipal sewage or fluids collected via rural septic tanks; surface runoff from industrial, agricultural, or residential lands due to irrigation and other uses of the land or accumulation of rain water; stormwater collected in storm drains and other such drainage systems; fluids used in industrial processes such as cutting, cooling, and washing processes; and the like. The term "influent" as used herein describes wastewater or other types of fluid streams entering a treatment mechanism, whether that treatment mechanism be a fluid stream treatment plant, a standalone fluid stream treatment apparatus, or the like. The term "effluent" as used herein describes a fluid stream that has been treated and is exiting or otherwise discharged from a treatment mechanism, whether that treatment mechanism be a fluid stream treatment plant, a standalone fluid stream treatment apparatus, or the like.

Exemplary methods and systems for removing chemicals and other substances from fluid streams include the use of materials with high ratios of surface area to weight. Additionally, exemplary methods and systems for removing chemicals and other substances from fluid streams include the use of materials that are highly porous. Such materials are generally useful in adsorption processes. Generally, adsorption is a surface-based phenomena, where atoms and molecules of one substance adhere to a surface of another bulk substance. Examples of materials with high surface area to weight ratios and highly porous natures include, but are not limited to, activated alumina, activated carbon, and ceramic particulate media.

Activated alumina can act as an adsorbent to atoms and molecules of many materials including phosphorus. Once phosphorus or other materials are adsorbed by the activated alumina and removed from a fluid stream, the phosphorus or other such materials can be removed from the activated alumina by treating the activated alumina. After such a treatment, the activated alumina can be reused to again adsorb phosphorus or other materials from a fluid stream. Activated alumina can be formed in a granular arrangement. This is to say that the activated alumina is formed into generally smooth spheres. Activated alumina can be formed into spheres such that the spheres are highly resistant to deformation or disintegration under pressure (i.e., the spheres have relatively high crush strength).

In one example, activated alumina can be formed in spheres that average about 1/16 inches (or about 1.5 millimeters) in diameter. In this example, the surface area to weight ratio is about or exceeds 300 square meters per gram, the total pore volume is about 0.5 cubic centimeters per gram, and the crush strength is about or exceeds 19 newtons. In another example, activated alumina can be formed in spheres that average about 1/8 inches (or about 3.2 millimeters) in diameter. In this example, the surface area to weight ratio is about or exceeds 300 square meters per gram, the total pore volume is about 0.5 cubic centimeters per gram, and the crush strength is about or exceeds 27 newtons. In another example, activated alumina can be formed in spheres that average about 3/16 inches (or about 4.7 millimeters) in diameter. In this example, the surface area to weight ratio is about or exceeds 300 square meters per gram, the total pore volume is about 0.5 cubic centimeters per gram, and the crush strength is about or exceeds 42 newtons. In yet another example, activated alumina can be formed in spheres that average about 1/4 inches (or about 6.4 millimeters) in diameter. In this example, the surface area to weight ratio is about or exceeds 300 square meters per gram, the total pore volume is about 0.5 cubic centimeters per gram, and the crush strength is about or exceeds 67 newtons. In other examples, activated alumina can be formed in spheres averaging about 3/8 inches (or about 9.5 millimeters) or 1/2 (or about 12.7 millimeters) inches in diameter. In such examples, the surface area to weight ratio is about or exceeds 300 square meters per gram, the total pore volume is about 0.5 cubic centimeters per gram, and the crush strength is about or exceeds 67 newtons. It will be understood that such disclosed dimensions and characteristics are exemplary only and activated alumina in granular form can be formed with additional shapes, sizes, and characteristics. It will be understood that activated alumina can be arranged in any number of ways to meet the needs of the methods and apparatus disclosed herein.

Activated carbon is another material that can act as an adsorbent to atoms and molecules of many materials including phosphorus. Activated carbon has a surface area to weight ratio that exceeds about 500 square meters per gram. Once phosphorus or other materials are adsorbed by the activated carbon and removed from a fluid stream, the phosphorus or other such materials can be removed from the activated carbon by treating the activated carbon. After such a treatment, the activated carbon can be reused to again adsorb phosphorus or other materials from a fluid stream. Activated carbon can be formed in a granular arrangement. This is to say that the activated carbon is formed into generally smooth spheres. Activated carbon can be formed in a variety of average sphere diameters. For example, granular activated carbon can be formed with an average sphere diameter of about 1/16 inches, 1/8 inches, 1/4 inches, 3/8 inches, or 1/2 inches.

Ceramic particulate media is yet another material that can act as an adsorbent to atoms and molecules of many materials including phosphorus. Ceramic particulate media is commonly a manufactured product formed from materials such as one or more of: ceramic oxide, non-oxide, or composite of metallic, non-metallic, or ceramic media. For example, ceramic particulate media can be comprised of one or more of silicon dioxide ($SiO_2$), aluminum oxide ($Al_2O_3$), iron oxide ($Fe_2O_3$), calcium oxide (CaO), magnesium oxide (MgO), potassium oxide ($K_2O$), sodium oxide ($Na_2O$), zirconium dioxide ($ZrO_2$), titanium dioxide ($TiO_2$), or similar materials or compounds. In one example, ceramic particulate media is formed from ceramic pastes derived from materials such as those detailed above. The ceramic particulate media can be formed into spheres with high surface area to weight ratios and average diameters that range from 1/16 inches to 1/2 inches or more.

Figure 2:
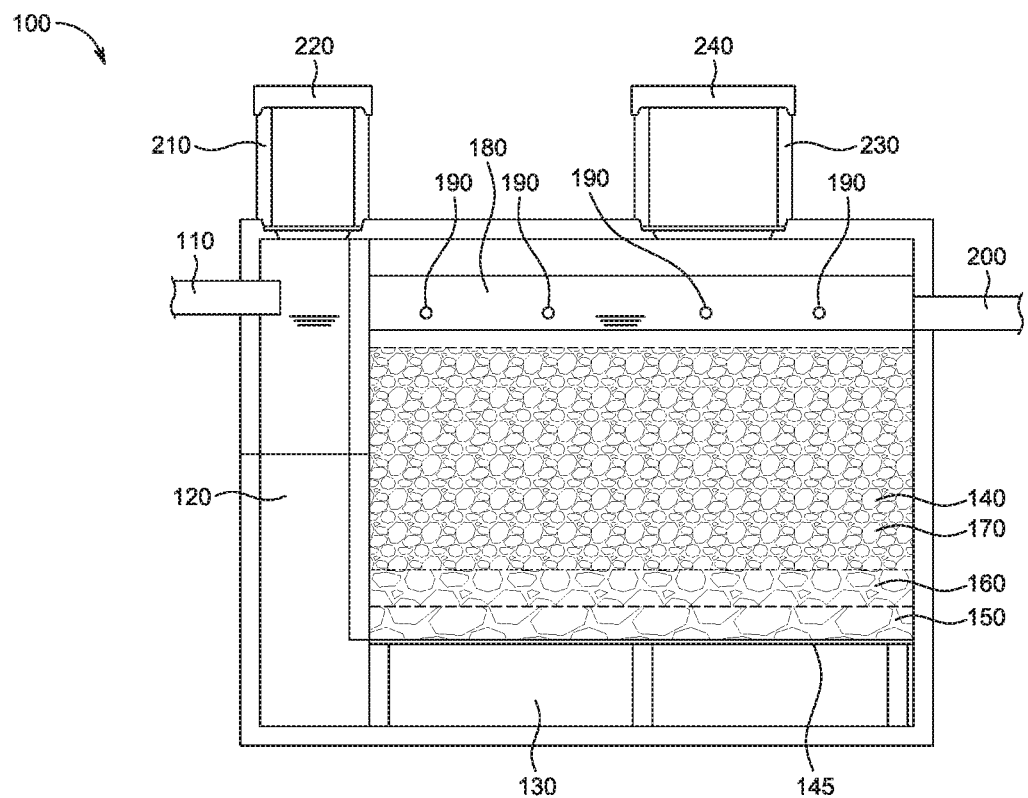
FIG. 2 is a schematic illustration depicting a cross-sectional view of the filter system of FIG. 1 along the line A-A shown in FIG. 1.
Figure 3:
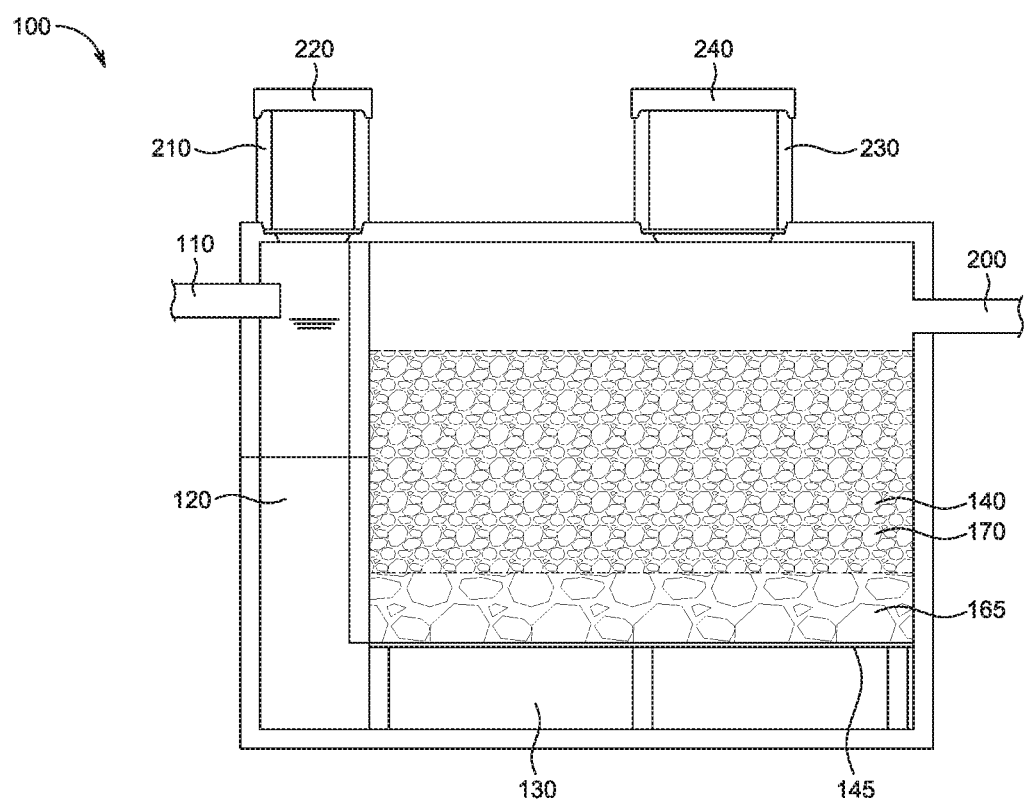
FIG. 3 is a schematic illustration depicting a cross-section view of the filtering system of FIG. 1 along the line A-A shown in FIG. 1 with an alternative arrangement for a filtration media layer and for effluent to exit the filtering system.
Figure 4:
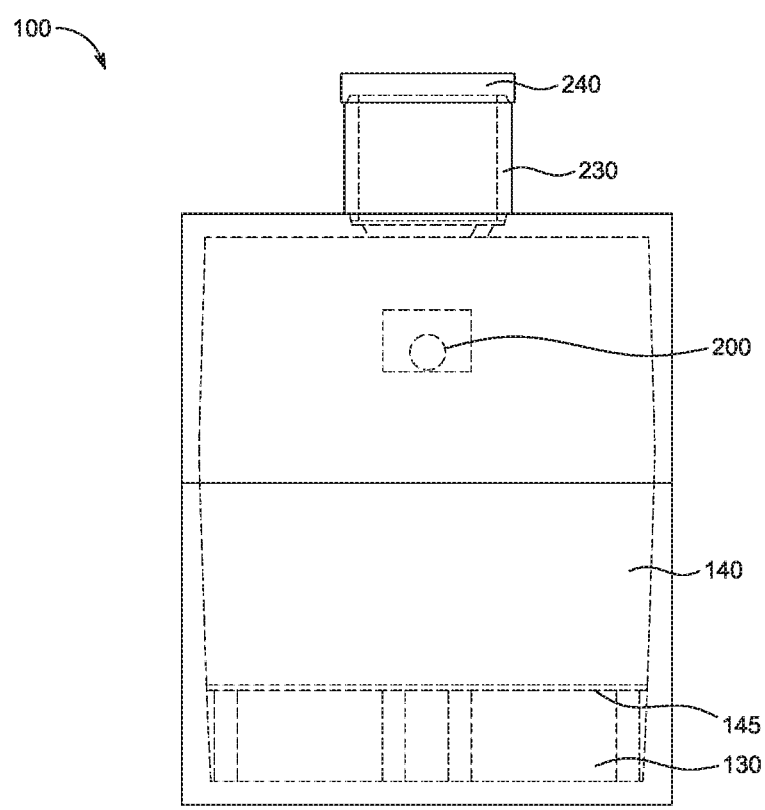
FIG. 4 is a schematic illustration depicting an end view of the filter system of FIG. 1.

As disclosed herein, activated alumina, activated carbon, ceramic particulate media, and other such materials can be used as adsorbent media in a filter apparatus or system to remove undesired chemicals or substances from fluid streams such as, for example, removing phosphorus from wastewater or other such fluid streams. An exemplary filter system 100 is illustrated in FIGS. 1-4. FIG. 1 is a top view of the filter system 100; FIG. 2 is a cross-section view of the filter system 100, with cross-section perspective shown by line A-A in FIG. 1; FIG. 3 is a cross-section view of the filter system 100, with cross-section perspective shown by line A-A in FIG. 1, and illustrates an alternative arrangement for a filtration media layer and for effluent to exit the filtering system; and FIG. 4 is an end view of the filter system 100. The filter system 100 is generally rectangular in shape.

The filter system 100 includes an influent pipe 110 in fluid communication with an influent chamber 120. As best illustrated in FIGS. 2 and 3, the influent pipe 110 is positioned near the top of a first end of the filter system 100 and the influent chamber 120 is positioned near that first end of the filter system 100. The influent pipe 110 can pass through the wall of that first end of the filter system 100, and an open end of the influent pipe 110 can terminate in free space within the influent chamber 120. In one embodiment, the influent chamber 120 is a generally vertical chamber extending generally from the top of the filter system 100 to the bottom of the filter system 100. The influent pipe 110 is arranged so that influent can flow through the influent pipe 110 by means of gravity, a pump or other methods. Once influent flows through the influent pipe 110 and exits its open end, the influent can enter and flow down through the influent chamber 120 via the force of gravity. Extending horizontally from the bottom of the influent chamber 120 and along the bottom of the filter system 100 is a settling chamber 130, also referred to as a solids retention chamber. It will be understood that when influent is pumped through the influent pipe 110 and into the influent chamber 120, the influent will further flow into and through the settling chamber 130.

Above the settling chamber 130 is an adsorbent media chamber 140 for holding various adsorbent media and other media useful in treating influent and other fluids. The adsorbent media chamber 140 can include a support structure 145 such as a frame or rack that is positioned at or near the bottom of the adsorbent media chamber 140, where the support structure forms a floor to support adsorbent media and other media positioned in the adsorbent media chamber 140. Such a support structure 145 can be arranged in various configurations that allow for the vertical flow of fluid through the support structure 145 while providing support for media positioned on the support structure 145. As will be further described, adsorbent media and other media can be arranged in one or more filtration media layers in the adsorbent media chamber 140. The filtration media layers can be arranged such that each filtration media layer comprising the same or different materials, the same or varying sizes of the same material, or the same or varying sizes of different materials.

As illustrated in FIG. 2, in one embodiment, a first filtration media layer 150 is positioned on top of the support structure 145 of the adsorbent media chamber 140 and a second filtration media layer 160 is positioned on top of the first filtration media layer 150. The first filtration media layer 150 and second filtration media layer 160 can be comprised of aggregate such as gravel, stones, or other porous arrangement of bulk materials. It will be understood that the first 150 and second 160 filtration media layers can be arranged and designed to provide structural support to above layers and remove pollutants, nutrients, and suspended solids from fluids, while allowing for the fluid to flow vertically through the first 150 and second 160 filtration media layers. It will be further understood that the first filtration media layer 150 and the second filtration media layer 160 can be comprised of different materials. For example, the first filtration media layer 150 may be comprised of relatively large aggregate, while the second filtration media layer 160 can be comprised of relatively small aggregate. In other embodiments, the size of the materials that make up the filtration media layers 150, 160 can become progressively smaller in size from the bottom of the first filtration media layer 150 to the top of the second filtration media layer 160.

Above the first 150 and second 160 filtration media layers is an adsorbent media layer 170 comprised of an adsorbent material such as activated alumina, activated carbon, ceramic particulate media, or combinations thereof. As will be understood, the adsorbent material can be granular in nature and can comprise a variety of different dimensional characteristics and attributes. Similar to previous descriptions, in exemplary embodiments, the granular adsorbent material can range from approximately 1/16 inches to approximately 1/2 inches in diameter; have a surface area to weight ratio that exceeds 300 square meters per gram; have a total pore volume of about 0.5 cubic centimeters per gram; and have a crush strength of about at least 19 newtons.

Figure 5:
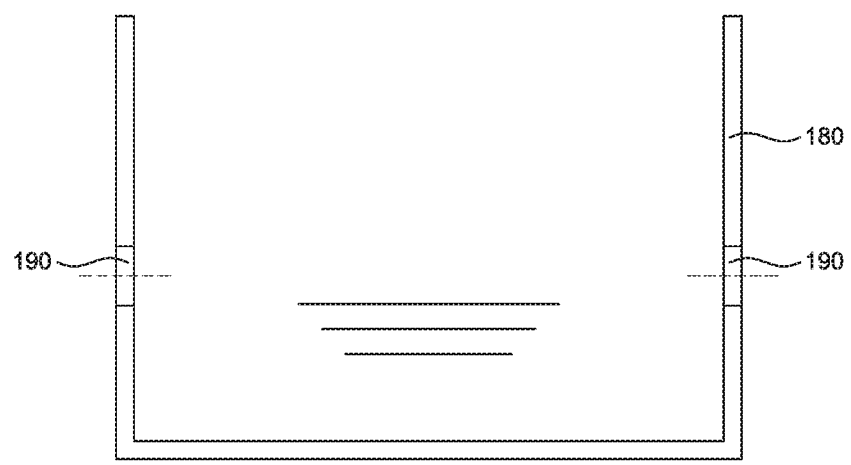
FIG. 5 is a schematic illustration depicting a detailed view of a effluent channel of the filter system of FIG. 1.

Above the adsorbent media layer 170 is an optional effluent collection channel 180 horizontally positioned near the top of the filter system 100 and includes a plurality of effluent collection ports 190. A detailed view of the effluent collection channel 180 is illustrated in FIG. 5. An effluent pipe 200 in fluid communication with the effluent collection channel 180 extends through a wall of the filter system 100 on a second end of the filter system 100 opposite the first end of the filter system 100 where the influent pipe 110 is located. The effluent pipe 200 provides a path through which to discharge effluent from the filter system 100.

As will be understood, influent enters the filter system 100 through the influent pipe 110, travels down through the influent chamber 120 and into the settling chamber 130. As influent continues to flow into the filter system 100, the influent chamber 120 and the settling chamber 130 become full of influent and the influent begins to rise through the settling chamber 130 into the adsorbent media chamber 140 due to hydrostatic pressure asserted by the continuous flow of influent flowing into the influent chamber 120 of the filter system 100. Once in the settling chamber 130, the influent flows generally vertically through the support structure 145, the first filtration media layer 150, the second filtration media layer 160, and adsorbent media layer 170.

As the influent passes through the first 150 and second 160 filtration media layers, particles such as suspended solids and other materials are filtered out of the influent or fall out of the influent due to gravity and settle into the settling chamber 130 where such solids and materials coagulate into a substance often referred to as sludge. As the influent continues to rise and pass through the adsorbent media layer 170 (i.e., coming into contact with the adsorbent material for example), phosphorus and other pollutants are adsorbed by the adsorbent media layer 170. The hydrostatic pressure from the continuous flow of influent into the filter system 100 provides for generally even flow of the influent through the adsorbent media chamber 140, and thus, provides for the optimization of the adsorbing process. As will be understood, as the influent rises through the first filtration media layer 150, second filtration media layer 160, and adsorbent media layer 170, the influent is transformed into treated wastewater and, thus, into effluent that is ready to be discharged from the filter system 100.

Once the level of fluid exceeds the top of the adsorbent media layer 170 and reaches the effluent channel 180, effluent can flow through the plurality of collection ports 190 to fill the effluent channel 180 with effluent. As the effluent channel 180 fills, the effluent will pass from the effluent channel 180 to the effluent pipe 200 and flow out of the filter system 100. Once the effluent has reached the effluent pipe 200, it has been treated and is safe to release into the environment outside the filter system 100. It will be understood that the position, number and size of the collection ports 190 can be arranged to evenly control the flow of influent and effluent through the filter system 100.

FIG. 3 illustrates another embodiment of the filtering system 100 with an alternative arrangement for a supporting layer in an adsorbent media chamber 140. In this embodiment, a single filtration media layer 165 is positioned on top of the support structure 145 at the bottom of the adsorbent media chamber 140. The single filtration media layer 165 can be composed of aggregate such as gravel, stones, or other porous arrangement of materials. It will be understood that the single filtration media layer 165 is arranged and designed to provide structural support to above layers and remove pollutants, nutrients, and suspended solids from fluids, while allowing for fluid to pass vertically through the single filtration media layer 165. In other embodiments, the size of the materials that make up the single filtration media layer 165 can become progressively smaller in size from the bottom of the single filtration media layer 165 to the top of the single filtration media layer 165. Similar to the previous embodiment, above the single filtration media layer 165 is an adsorbent media layer 170 comprised of an adsorbent material such as activated alumina, activated carbon, ceramic particulate media, or similar material.

Above the adsorbent media layer 170 is free space in which treated fluid (i.e., effluent) can collect once it has passed through the adsorbent media chamber 140. An effluent pipe 200 extends through the wall of the filter system 100, with an open end of the effluent pipe 200 terminating in or adjacent to the free space above the adsorbent media chamber 140. The effluent pipe 200 provides a path through which to discharge effluent from the filter system 100. Similar to the previously described embodiment, influent enters the filter system 100 through the influent pipe 110, travels down through the influent chamber 120 and into the settling chamber 130. As influent continues to flow into the filter system 100, the influent chamber 120 and the settling chamber 130 become full of influent and the influent begins to rise through the settling chamber 130 into the adsorbent media chamber 140 due to hydrostatic pressure asserted by the continuous flow of influent flowing into the filter system 100. The influent flows generally vertically through the support structure 145, single filtration media layer 165, and adsorbent media layer 170. As the influent passes through the single filtration media layer 165, particles such as suspended solids and other materials are filtered out of the influent or fall out of the influent due to gravity and settle into the settling chamber 130 where it coagulates into sludge.

As the influent continues to rise and pass through the adsorbent media layer 170, phosphorus and other pollutants are adsorbed by the adsorbent media layer 170. The hydrostatic pressure from the continuous flow of influent into the filter system 100 provides for generally even flow of the influent through the adsorbent media chamber 140, and thus, providing for the optimization of the adsorbing process. As will be understood, as the influent rises through the single filtration media layer 165 and adsorbent media layer 170, the influent is transformed into treated wastewater and, thus, into effluent that can discharged from the filter system 100. Once the level of fluid exceeds the top of the adsorbent media layer 170 and collects in the free space above the adsorbent media chamber 140, effluent can flow through the effluent pipe 200 and flow out of the filter system 100.

Figure 6:
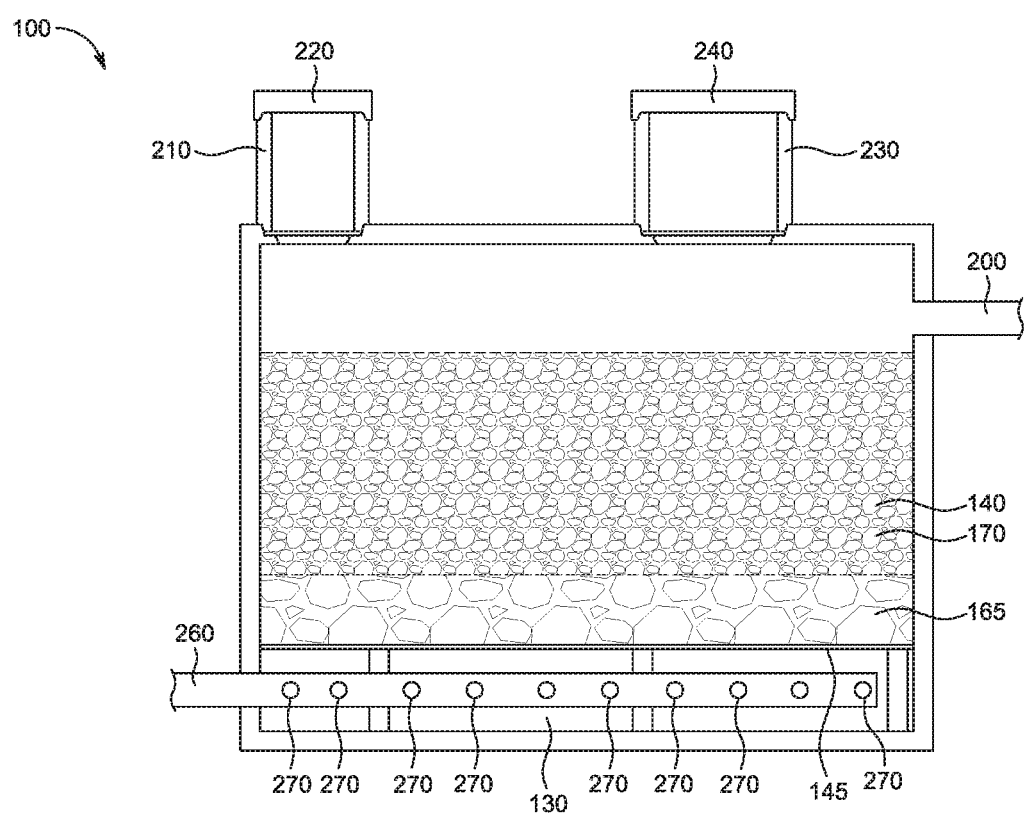
FIG. 6 is a schematic illustration depicting a cross-section view of the filtering system of FIG. 1 with an alternative arrangement for influent to enter the filtering system.

FIG. 6 is a schematic illustration depicting a cross-section view of a filtering system 100 with an alternative arrangement for influent to enter the filtering system. The filtering system 100 of FIG. 6 includes an influent pipe 260 located near the bottom of the filtering system 100 and runs nearly the length of the settling chamber 130. The filtering system 100 of FIG. 6 does not include an influent chamber. The influent pipe include a series of apertures 270 through which influent can enter the settling chamber 130. An adsorbent media chamber 140 is located above the settling chamber 130 and separated from the settling chamber 130 by a support structure 145. The adsorbent media chamber 140 can include a single filtering media layer 165 and an adsorbent media layer 170. As will be understood, the adsorbent media chamber 140 can include multiple filtering media layers. As previously described, influent can rise through the adsorbent media chamber 140 to be treated and emerge as effluent. The effluent can gather above the adsorbent media layer 140 and flow out of the filtering system 100 via the effluent pipe 200.

The methods of filtration described herein can be implemented and achieved without the use of any electrical or mechanical power. For example, the methods of filtration described herein can be implemented and achieved through the force of gravity. For example, with reference to FIGS. 1-4, the source of influent can be located above the filtering system 100, where the force of gravity can cause influent to flow through the influent pipe 110 and into the influent chamber 120. As the influent falls to the bottom of the influent chamber 120 due to gravity, the influent proceeds into the settling chamber 130, where the influent fills the settling chamber 130. While influent fills the settling chamber 130, additional influent continues to flow through the influent pipe 110 and into the influent chamber 120. The influent chamber 120 can act as a column to assert hydrostatic forces on the influent in the settling chamber 130. Such hydrostatic forces can cause the influent to rise into the adsorbent media chamber 140 and through the filtering media layers 150, 160, or 165 and the adsorbent media layer 170. As fluid passes through the adsorbent media chamber 140, the fluid is treated and becomes effluent. The hydrostatic forces continue to cause the effluent to rise and gather in the space above the adsorbent media chamber 140, and flow out of the filtering system 100 through the effluent pipe 200.

With reference to FIG. 6, similar to the description of above, the source of influent can be located above the filtering system 100, where the force of gravity can cause influent to flow through the influent pipe 260 and fill the settling chamber 130. It will be understood that the influent pipe 260 can include a vertical section (not illustrated) joined to the illustrated horizontal section with an elbow joint. The vertical section of the influent pipe 260 can act as a column to assert a hydrostatic force onto the influent in the settling chamber 130 and cause the influent to rise through the adsorbent media chamber 140. The influent will pass through the adsorbent media chamber 140, become effluent, gather in the space above the adsorbent media chamber 140, and exit the filtering system 100 though the effluent pipe 200.

As illustrated in FIGS. 1-6, the filter system 100 can include an influent chamber riser 210 above the influent chamber 120. An influent chamber riser lid 220 can be positioned on the influent chamber riser 210 to cap off the influent chamber riser 210 while providing selective access to influent chamber 120 for inspection and maintenance. Similarly, the filter system 100 can include an adsorbent media chamber riser 230 above the adsorbent media chamber 140. An adsorbent media chamber riser lid 240 can be positioned on the adsorbent media chamber riser 230 to cap off the adsorbent media chamber riser 230 while providing selective access to adsorbent media chamber 140 for inspection and maintenance.

Figure 7:
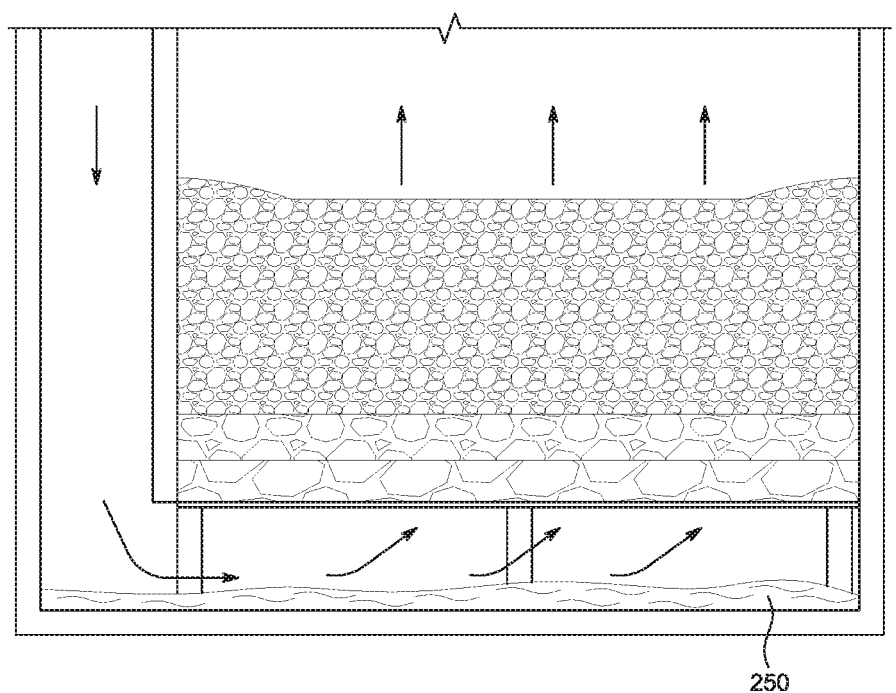
FIG. 7 is a schematic illustration depicting an initial stage of operation of the filter system of FIG. 1.
Figure 8:
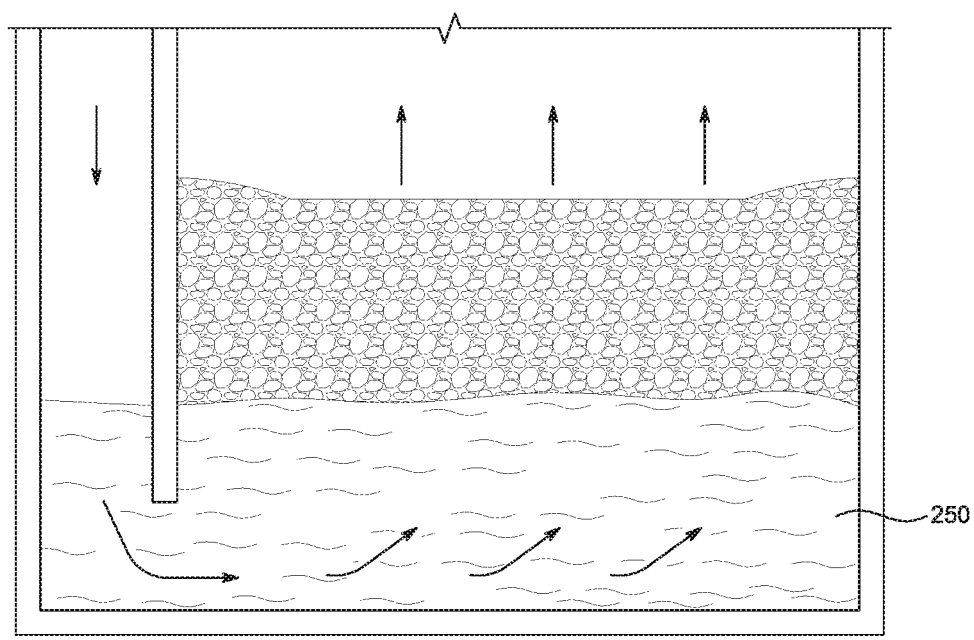
FIG. 8 is a schematic illustration depicting an intermediate stage of operation of the filter system of FIG. 1.
Figure 9:
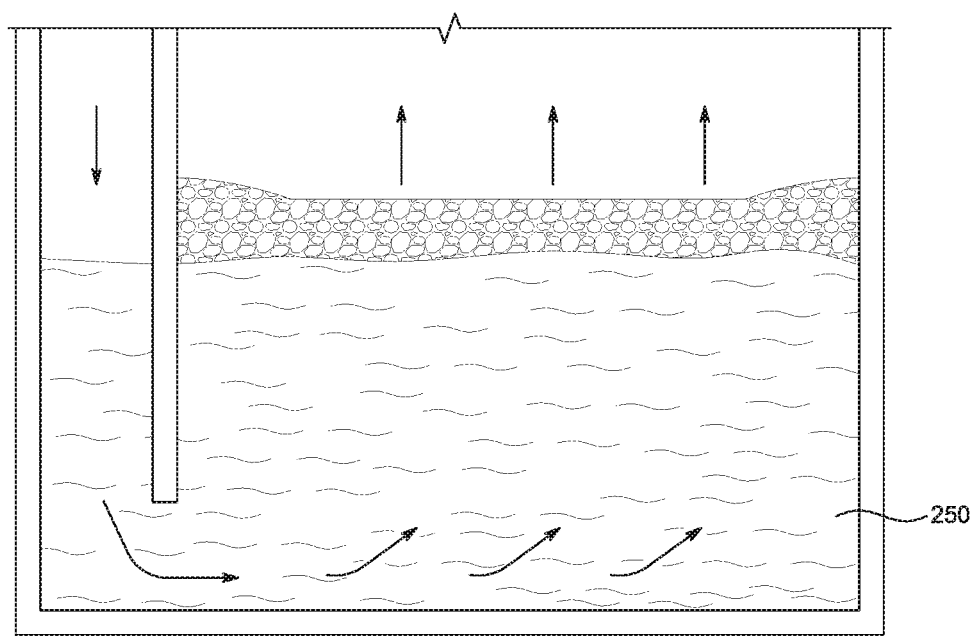
FIG. 9 is a schematic illustration depicting a near final stage of operation of the filter system of FIG. 1.

As influent flows through the filter system 100, sludge collects in the settling chamber 130. After a certain amount of influent has flowed through the filter system 100, depending on the level of suspended solids in the influent, the filter system 100 will require maintenance to continue efficient operations. FIGS. 7-9 illustrate the stages of sludge accumulation prior to maintenance of the filter system 100. The flow lines in FIGS. 7-9 represent the flow of influence through the filter system 100.

FIG. 7 illustrates the filter system 100 at an initial stage, where sludge begins to settle and accumulate at the bottom of the filter system 100. FIG. 8 illustrates the filter system 100 at an intermediate stage, where sludge has settled and accumulated at the bottom of the filter system 100 such that the sludge begins to enter the adsorbent media chamber 140. The filter system 100 remains effective at this stage. FIG. 9 illustrates the filter system 100 in a near-final stage, where the sludge is approaching the top or the adsorbent media layer 170. At such a stage, the filter system 100 begins to lose the water head pressure required to move the influent through the filter system 100. At this near-final stage, maintenance of the filter system 100 can be conducted.

Maintenance can comprise the steps of plugging the effluent pipe 200; inserting a submersible pump or hose into the influent chamber 120; and pumping the sludge out of the settling chamber 130 and into a tank or other suitable vessel. Because of the nature of the adsorbent media selected (such as activated alumina, activated carbon, ceramic particulate media, or similar material) and the arrangement of the filter system 100, the adsorbent media does not require frequent backwashing, which maximizes the efficiency of in-service time of the filter system 100. It is noted that throughout its lifecycle, sludge accumulated in the filter system 100 can further assist in filtering out additional suspended solids from newly introduced influent. It is also noted that during maintenance, water or other liquids can be passed through the effluent pipe 200 or through the adsorbent media chamber riser 230 to flow over and wash the adsorbent media. Such water or other liquids can collect in the settling chamber 130 and be removed from the filter system 100 by a pump or other suitable methods.

It will be understood that when certain filter systems disclosed herein are placed into service, the filter system can be installed below the surface of the ground (i.e., buried in the ground). The arrangement of the filter systems provides for maintaining the filter systems without requiring the removal of the filter system from its installed position below the surface of the ground. Features such as the influent chamber riser and adsorbent media chamber riser provide the access needed to maintain the filter system from the surface without requiring the removal of the filter system from the ground. Furthermore, certain prior art systems require the removal of a substantial portion of the inner components of the system to facilitate maintenance. Other prior art systems require that a worker descend into the system in order to perform maintenance. The filter systems described herein avoid such limitations of the prior art by providing for maintenance via access from the risers.

The specific arrangement of the filter system can be influenced by a number of factors. For instance, the height of the settling chamber can be influenced by the amount of suspended solids expected in the influent and the expected flow rate of the influent. The higher the amount of suspended solids and the higher the flow rate, then the greater the height of the settling chamber. In another example, the flow rate of the influent and the expected levels of the undesirable chemical or substance in the influent can influence the size of the adsorbent media chamber and the amount of adsorbent media used in the filter. As will be understood, when the flow rate is expected to be high and the level of the undesirable chemical in the influent is expected to be high, the adsorbent media chamber should be designed to be larger and more adsorbent media should be used. As discussed herein, the flow rate can be controlled by how much influent is pumped or fed into the influent chamber. Additionally, the flow rate can be controlled by the number, size, and position of collection ports formed in the effluent channel. The larger the number and size of the collection ports, the higher the allowable flow rate of the influent into the filter and through the adsorbent media, and the rate of flow of the effluent out of the filter. Alternatively, where no effluent channel is used, the flow rate can be controlled by the cross-section size of the effluent pipe. The larger the cross-sectional area of the effluent pipe, the higher the allowable flow rate of the influent into the filter and through the adsorbent media, and the rate of flow of the effluent out of the filter.

Figure 10:
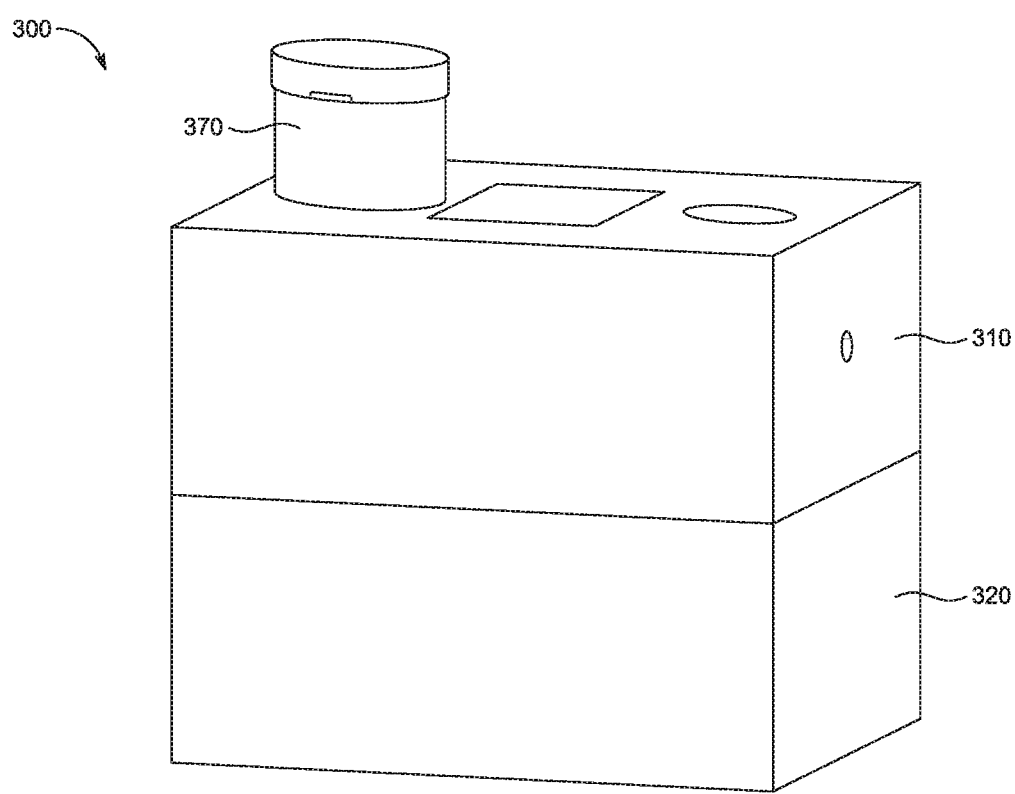
FIG. 10 is a schematic illustration depicting a perspective view of a main housing for use with a filter system.
Figure 11:
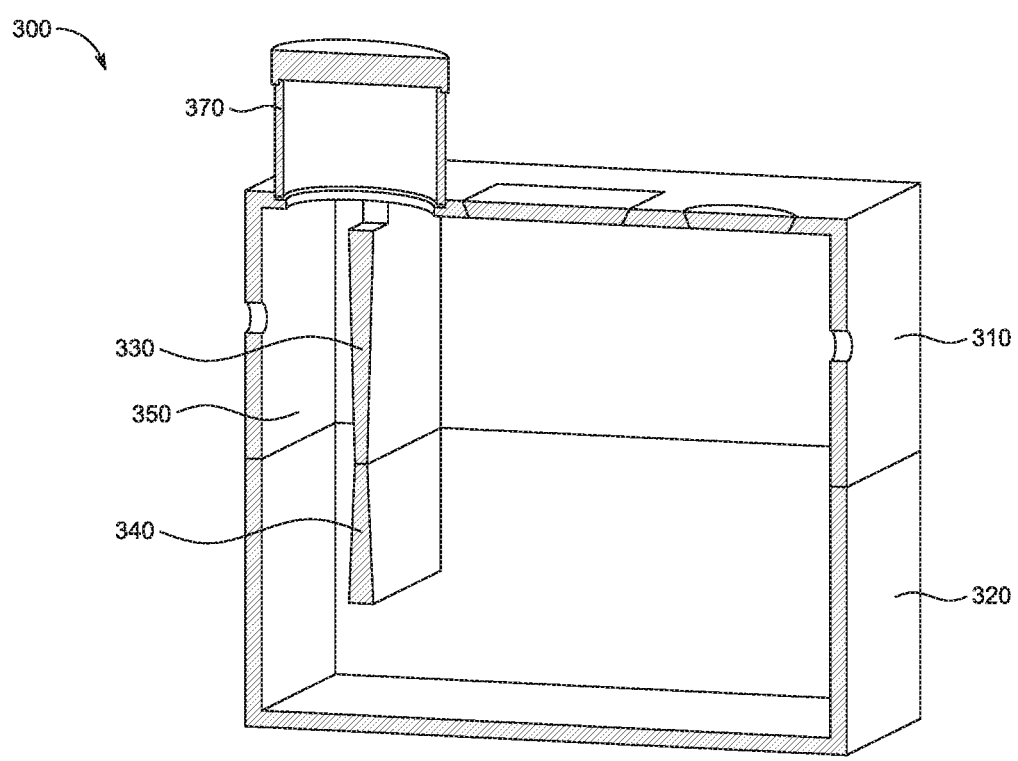
FIG. 11 is a schematic illustration depicting a cross-sectional view of the main housing of FIG. 10.

FIGS. 10-14 illustrate components of an exemplary filter system. FIG. 10 illustrates a main housing 300 for use with a filter system, and FIG. 11 illustrates the main housing 300 in cross-section. In one embodiment, the overall dimensions of the main housing 300 are approximately seven feet long, six feet deep, and five feet six inches wide. Such an arrangement provides for approximately 230 cubic feet of volume inside the main housing 300. Such a volume can accommodate the treatment of approximately 1000 gallons per day of influent. The main housing 300 can be comprised of two components—a upper housing 310 and a lower housing 320. As best illustrated in FIG. 11, the upper housing 310 and lower housing 320 can be designed to mate to form the main housing 300. The upper housing 310 can include a vertical internal wall 330, and the lower housing 320 can include a corresponding vertical internal wall 340. When the upper housing 310 and lower housing 320 are mated, the vertical internal walls 330, 340 also mate and form an influent chamber between the internal vertical walls 330, 340 and an interior surface 350 of the main housing 300. The vertical internal wall 340 of the lower housing 320 does not extend to the bottom of the lower housing 320, thus, allowing influent from the influent chamber to flow under the internal vertical wall 340 as previously described. Therefore, it will be understood that the lower portion of the lower housing 320 can serve as a settling chamber. Additional support structures can be added such as a rack or frame to provide for the placement of filtration media layers and adsorbent media to form an adsorbent media chamber above the settlement chamber.

Figure 12:
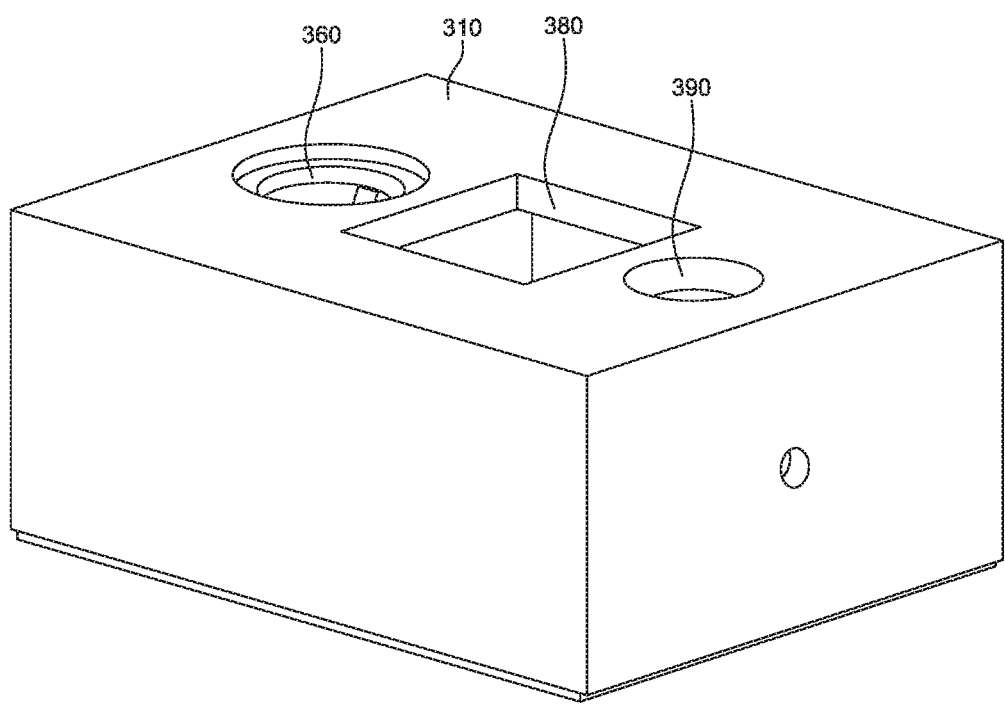
FIG. 12 is a schematic illustration depicting a perspective view of an upper housing of the main housing of FIG. 10.
Figure 13:
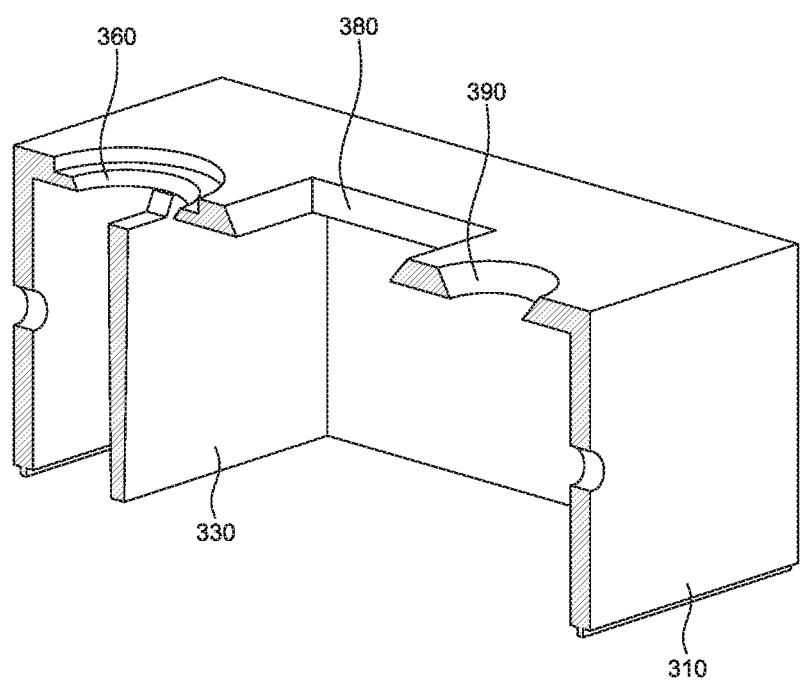
FIG. 13 is a schematic illustration depicting a cross-sectional view of the upper housing of FIG. 12.
Figure 14:
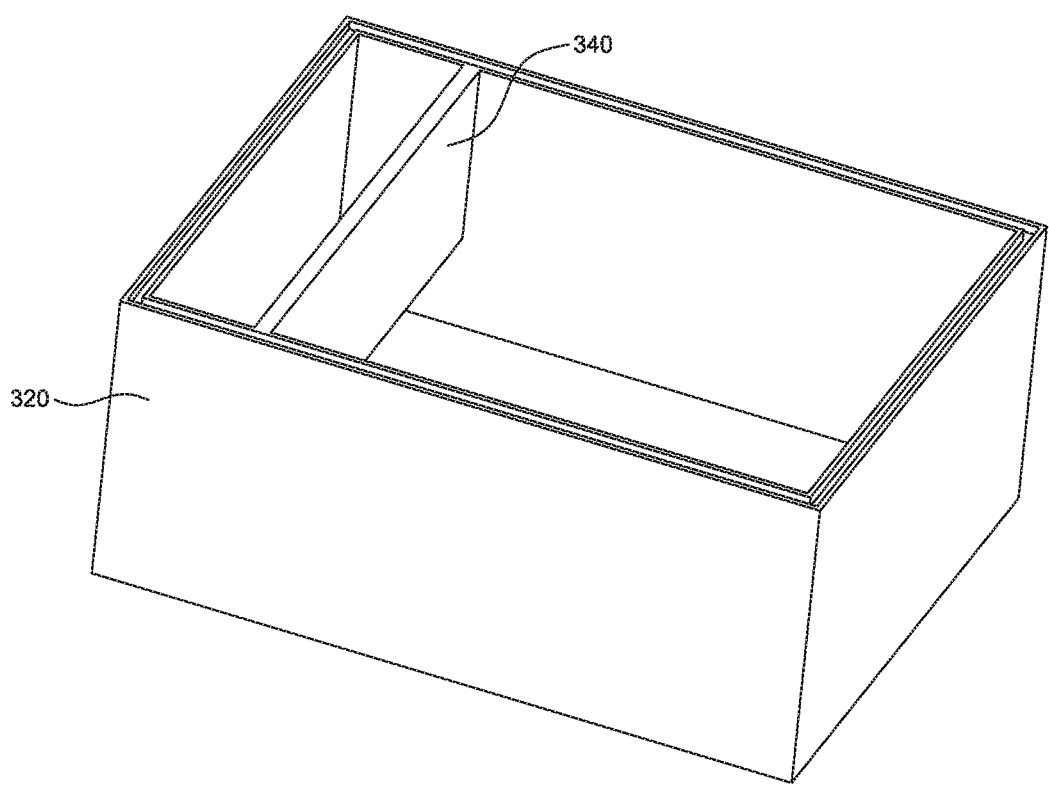
FIG. 14 is a schematic illustration depicting a perspective view of a lower housing of the main housing of FIG. 10.

The upper housing 310 includes a series of openings in its top surface to accommodate access to the interior of the main housing 300. For example (as best illustrated in FIG. 12), the upper housing 310 can include a first opening 360 that can accommodate a riser 370 above the influent chamber. The upper housing 310 can include additional openings 380, 390 to accommodate risers above the adsorbent media chamber. As best illustrated in FIG. 10, the openings can be sealed with lids.

Figure 15:
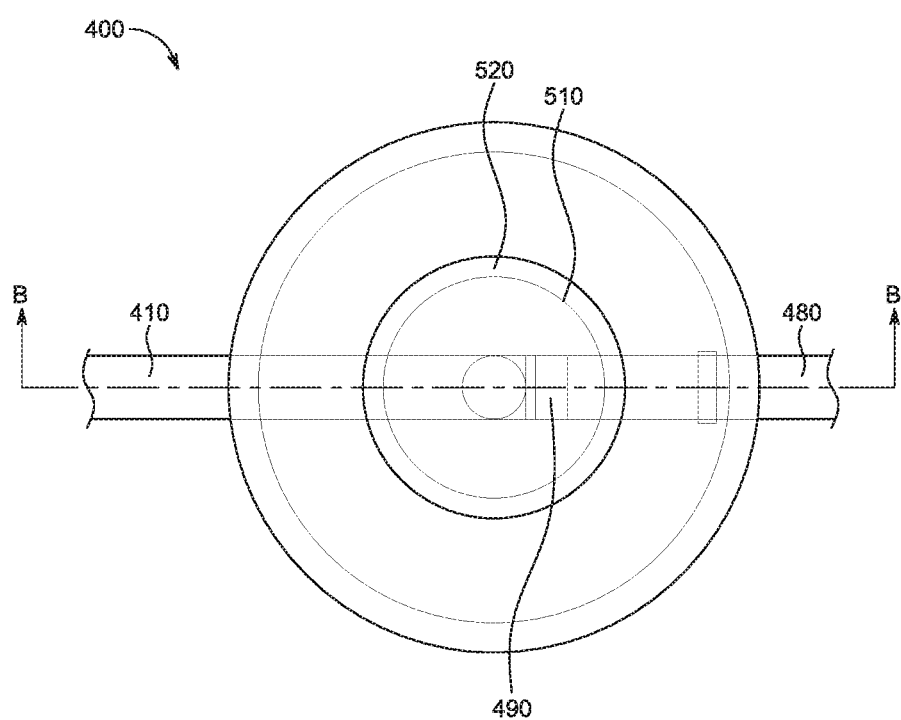
FIG. 15 is a schematic illustration depicting a top view of another embodiment of a filter system in accordance with the disclosure herein.
Figure 16:
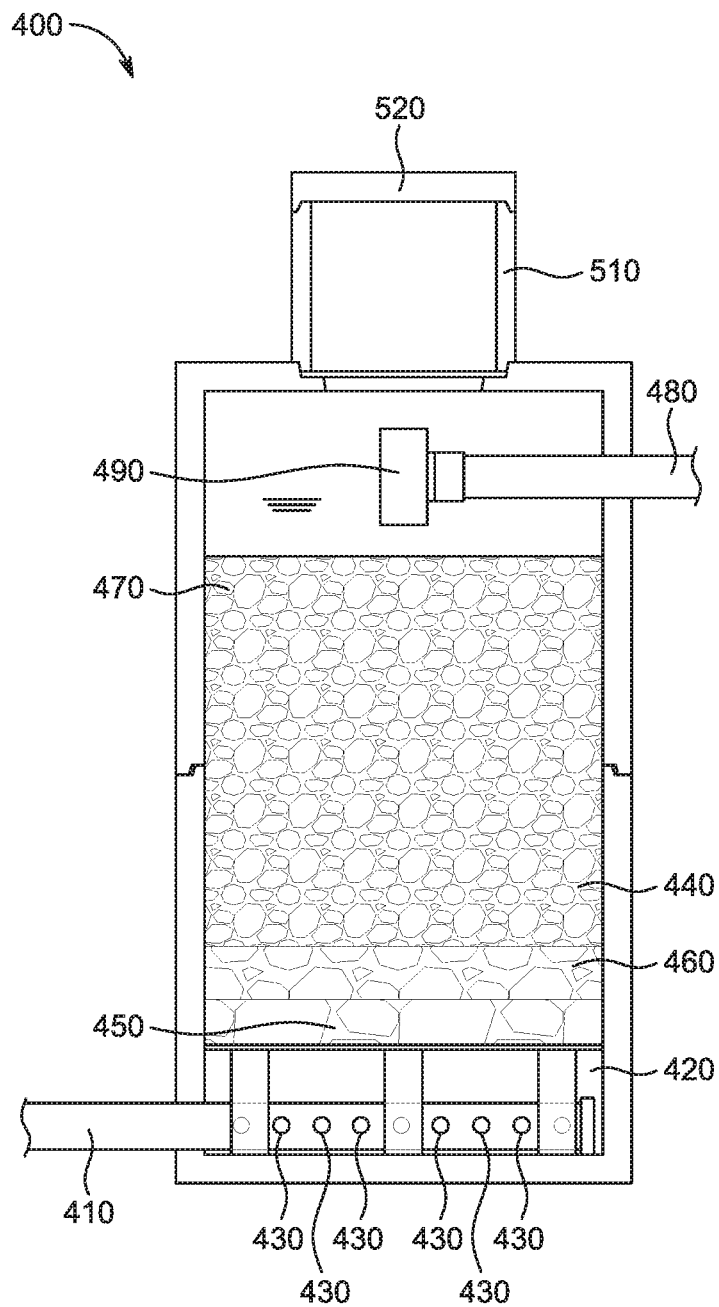
FIG. 16 is a schematic illustration depicting a cross-sectional view of the filter system of FIG. 15 along the line B-B shown in FIG. 15.
Figure 17:
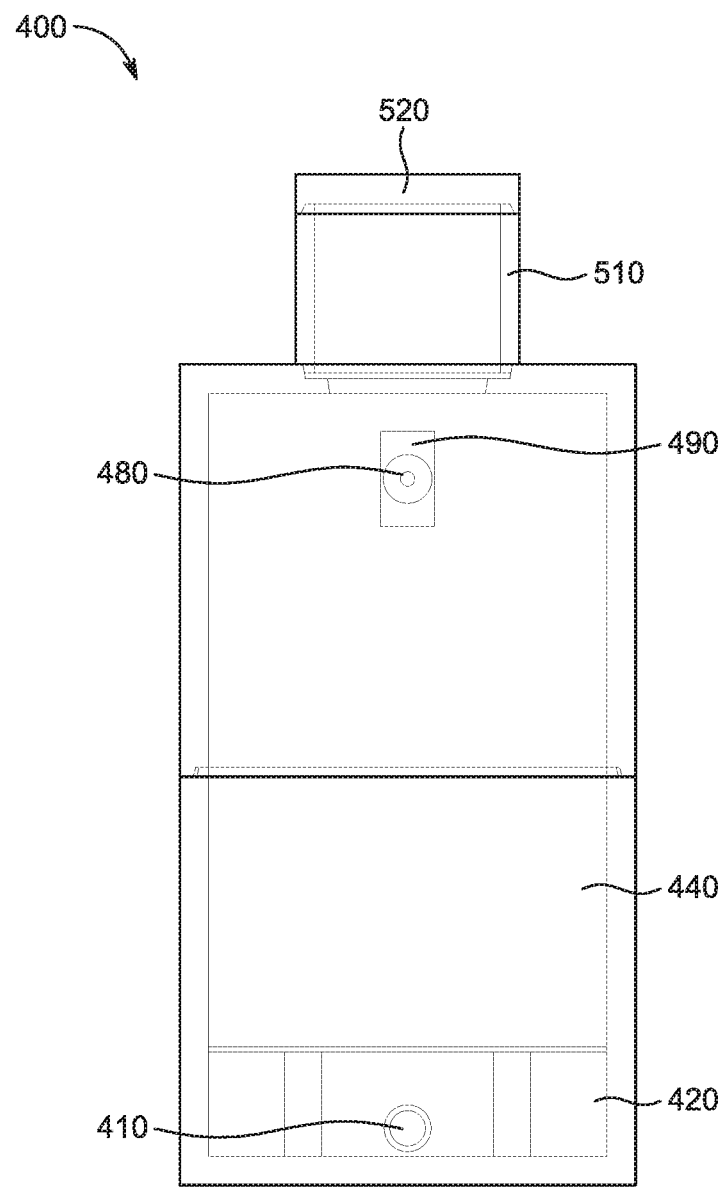
FIG. 17 is a schematic illustration depicting a side view of the filter system of FIG. 15.

Another exemplary embodiment of a filter system 400 is illustrated in FIGS. 15-17. The filter system 400 depicted in FIGS. 15-17 is a circular or cylindrical filter system. While this filter system 400 operates on principles similar to the filter system 100 illustrated in FIGS. 1-6, the filter system 400 of FIGS. 15-17 includes a number of unique features. FIG. 15 is a top view of the filter system 400; FIG. 16 is a cross-section view of the filter system 400, with cross-section perspective shown by line B-B in FIG. 15; and FIG. 17 is a side view of the filter system 400.

The filter system 400 includes an influent pipe 410 located at the bottom of the filter system 400 and in fluid communication with a settling chamber 420 also located at the bottom of the filter system 400. The influent pipe 410 includes a plurality of outlet ports 430. Influent is pumped through the influent pipe 410, through the outlet ports 430 and into the settling chamber 420. An adsorbent media chamber 440 is positioned above the settling chamber 420. The adsorbent media chamber 440 includes a first filtration media layer 450 and a second filtration media layer 460. Similar to prior descriptions, the first 450 and second 460 filtration media layers can be aggregate such as gravel or stones that provide structural support but allow flow of fluid through the layers. Above the first 450 and second 460 filtration media layers is an adsorbent media layer 470. The adsorbent media layer 470 can comprise activated alumina, activated carbon, ceramic particulate media, or combinations thereof. Above the adsorbent media layer 470 is an effluent pipe 480 with one end open to the free space above the adsorbent media chamber 440 and the other end positioned outside the filter system 400 to provide a path for effluent to be discharged from the filter system 400.

Figure 18:
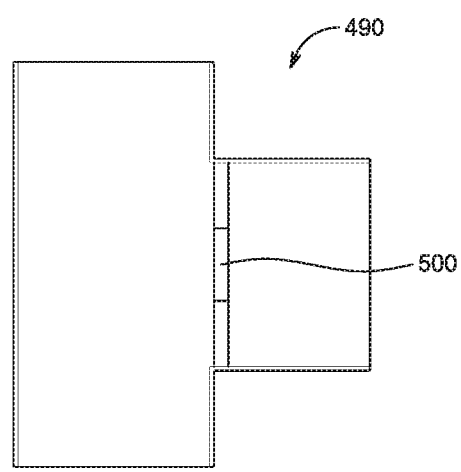
FIG. 18 is a schematic illustration depicting a detailed view of a flow equalizing device of the filter system of FIG. 15.

FIG. 18 is a detailed view of an optional flow equalizing device 490 that can be secured to the open end of the effluent pipe 480 that is located above the adsorbent media chamber 440 within the filter system 400. The flow equalizing device 490 assists in controlling the flow out of the filter system 400. The flow equalizing device 490 includes a central port 500, which is sized to allow a certain volume of fluid flow through the central port 500. It will be understood that controlling the rate of flow of effluent out of the filter system 400 will also regulate the volume of flow of influent into the filter system 400 and through the first 450 and second 460 filtration media layers and the adsorbent media layer 470. Such control can optimize the efficiency of filtering an undesirable chemical from the influent and the discharge of the effluent from the filter system 400. It will be understood that the effluent pipe 480 and flow equalizing device 490 can be used with the filter system 100 depicted in FIGS. 1-6. Conversely, the effluent collection channel 180 with effluent collection ports 190 and effluent pipe 200 depicted in FIGS. 1-2 can be utilized with the filter system 400 depicted in FIGS. 15-17. The filter system 400 can include a riser 510 above the adsorbent media chamber 440 with a riser lid 520 to cover the riser 510. It will be understood that the lid 520 can be removed to inspect or gain access inside the filter system 400 for maintenance, washing of the adsorbent media, etc.

It is noted that the filter system 400 depicted in FIGS. 15-17 does not utilize an influent chamber as does the filter system 100 depicted in FIGS. 1-4. The filter system 400 can be subject to the same maintenance cycle depicted in FIGS. 7-9. When sludge is accumulated such that it approaches the top of the adsorbent media 470, maintenance can be performed on the filter system 400. Such maintenance can comprise the steps of plugging the effluent pipe 480; connecting a vacuum pump to the influent pipe 410; and extracting the sludge out of the settling chamber 430 and into a tank or other suitable vessel. In another example, a pump can access the sludge through the riser 510 in the top of the filter system 400.

Because of the nature of the adsorbent media selected, such as activated alumina, activated carbon, or ceramic particulate media, and the arrangement of the filter system 400, the adsorbent media does not require frequent backwashing, which maximizes the efficiency of in-service time of the filter system 400. When backwashing is required, water or other fluids can enter the filter system 400 through the effluent pipe 480 or the riser 510.

Prior to the adsorbent media being positioned in an adsorbent media chamber, the adsorbent media can optionally undergo pre-processing. In one example, the adsorbent media can be coated with a chemical, compound, or other substance that further facilitates the treatment of fluid streams. In one embodiment of such an optional coating process, activated alumina is used as the adsorbent media and the activated alumina is coated with aluminum sulfate ($Al_2(SO_4)_3$) prior to its use as adsorbent media. Aluminum sulfate can benefit the fluid treatment process because aluminum sulfate can cause dissolved solids or particles suspended in the treated fluid stream to coagulate into larger particles. Such coagulation can make it more likely that dissolved and suspended solids precipitate out of the treated fluid stream and settle at the bottom of the filter system due to the force of gravity. In addition, once coagulated into larger particles, such solids are more likely to be filtered out of the treated fluid stream as the fluid moves through the adsorption media. One exemplary method of coating adsorption media with a beneficial compound includes the steps of first preparing a solution and subsequently treating the adsorption media in the solution to coat the adsorption media with the beneficial compound.

In one example, a treating tank is utilized to prepare and hold an aluminum sulfate solution for coating activated alumina. In such an example a 500 gallon polyethylene tank can be used to prepare the aluminum sulfate solution. A valve can be installed in the bottom of the tank to facilitate removal of the tank's contents. For example, the valve can be a 2.5 inch polyvinyl chloride (PVC) ball valve. To prepare the solution, the tank is filled with 400 gallons of water. The water can be filtered water or tap water. Approximately fifty-seven pounds of aluminum sulfate is added to the 400 gallons of water in the tank. A mechanical means, such as an aerator or mixer, is used to dissolve the aluminum sulfate into the 400 gallons of water to form the solution. Once the aluminum sulfate is dissolved in the water, the solution is ready for coating activated alumina.

Approximately 3400 pounds (about 67 cubic feet) of activated alumina is poured into the tank to soak in the prepared aluminum sulfate solution. The activated alumina can be soaked for 24 hours. After the appropriate soaking period, a receptacle can be placed under the ball valve in the bottom of the tank, the ball valve can be opened, and the receptacle can collect the treated and activated alumina, which is now coated with aluminum sulfate. Once the coated activated alumina is collected, it can be dried for four hours. Once dried, the coated activated alumina can be placed into bags or containers for storage and later use, or the coated activated alumina can be placed into the adsorption media chamber of a filter system to facilitate treatment of fluids. It will be understood that once activated alumina is used in a filter system, it can once again be treated as described herein to form an new aluminum sulfate coating on the activated alumina. It will be understood that the described method of coating activated alumina with aluminum sulfate is but one method of pre-processing adsorbent media. Similar processes can be applied to activated carbon, ceramic particulate media, and other such materials. The specific steps, amounts, durations, etc. can deviate from those described herein and remain within the scope of this disclosure.

The foregoing description of examples has been presented for purposes of illustration and description. It is not intended to be exhaustive or limiting to the forms described. Numerous modifications are possible in light of the above teachings. Some of those modifications have been discussed, and others will be understood by those skilled in the art. The examples were chosen and described in order to best illustrate principles of various examples as are suited to particular uses contemplated. The scope is, of course, not limited to the examples set forth herein, but can be employed in any number of applications and equivalent devices by those of ordinary skill in the art.

We claim:

1. A filtering system for filtering a fluid stream, the filtering system comprising:
   a housing comprising:
      an external wall;
      a top wall;
      a bottom wall;
      an internal wall adjacently spaced apart from the external wall extending from the top wall to a free edge disposed above the bottom wall;
      an influent chamber defined between the internal wall and the external wall;
      a rack extending horizontally from the free edge of the internal wall; and
      a settling chamber defined between the rack and the bottom wall and in fluid communication with the influent chamber for holding suspended or dissolved solids, pollutants, or nutrients filtered from the fluid stream;
   an influent pipe extending through the external wall to an upper portion of the influent chamber through which the fluid stream flows into the housing;
   an adsorbent media chamber positioned above the rack and in fluid communication with the settling chamber through the rack;
   wherein the rack separates the settling chamber from the adsorbent media chamber;
   a filtration media layer positioned in the adsorbent media chamber and on top of the rack;

an adsorbing media layer positioned in the adsorbent media chamber and on top of the filtration media layer; and an effluent pipe through which fluid filtered by the absorbing media layer flows out of the housing.

2. The filtering system of claim 1, wherein the adsorbing media layer comprises a phosphorus adsorbing media.

3. The filtering system of claim 2, wherein the phosphorus-adsorbing media is activated alumina, activated carbon, ceramic particulate media, or combinations thereof.

4. The filtering system of claim 3, wherein the adsorbing media layer is comprised of spheres between about 1/16 inches in diameter and 1/2 inches in diameter.

5. The filtering system of claim 3, wherein the adsorbing media layer is comprised of spheres with a surface area to weight ratio of at least about 300 square meters per gram.

6. The filtering system of claim 3, wherein the adsorbing media layer is comprised of spheres with a total pore volume of about 0.5 cubic centimeters per gram.

7. The filtering system of claim 3, further comprising a coating of aluminum sulfate on at least a portion of the adsorbing media.

8. The filtering system of claim 1, wherein the filtration media layer comprises a first filtration media layer positioned on top of the rack and a second filtration media layer positioned on top of the first filtration media layer.

9. The filtering system of claim 8, wherein the first filtration media layer is comprised of gravel.

10. The filtering system of claim 8, wherein the first filtration media layer is comprised of gravel averaging a first diameter and the second filtration media layer is comprised of gravel averaging a second diameter, wherein the first diameter is larger than the second diameter.

11. The filtering system of claim 1, wherein the influent pipe includes an end terminating in the influent chamber.

12. The filtering system of claim 1, wherein the effluent pipe is positioned proximate to the top of the filtering system.

13. The filtering system of claim 12, wherein the effluent pipe extends through a wall of the filtering system.

14. The filtering system of claim 13, further comprising an influent collection channel with a plurality of apertures in fluid communication with the adsorbent chamber and the effluent pipe.

15. The filtering system of claim 13, further including a flow equalization device in fluid communication with the effluent pipe and the adsorbent media chamber.

16. The filtering system of claim 1, further comprising at least one opening in the top of the filtering system to facilitate inspection of an interior of the filtering system.

17. The filtering system of claim 1, wherein the fluid stream flows through the influent pipe and into the filtering system under the force of gravity.

18. The filtering system of claim 17, wherein the fluid stream flows through the effluent pipe and out of the filtering system under a hydrostatic force cause by the fluid stream flowing into the filtering system under the force of gravity.

19. The filtering system of claim 1, wherein the fluid stream flows from the settling chamber vertically though the adsorbent chamber prior to flowing out of the filtering system.

20. A method for filtering a fluid stream, the method includes:
  providing a filtering system for filtering a fluid stream, the filtering system comprising:
    a housing comprising:
      an external wall;
      a top wall;
      a bottom wall;
      an internal wall adjacently spaced apart from the external wall extending from the top wall to a free edge disposed above the bottom wall;
      an influent chamber defined between the internal wall and the external wall;
      a rack extending horizontally from the free edge of the internal wall; and
      a settling chamber defined between the rack and the bottom wall and in fluid communication with the influent chamber for holding suspended or dissolved solids, pollutants, or nutrients filtered from the fluid stream;
    an influent pipe extending through the external wall to an upper portion of the influent chamber through which the fluid stream flows into the housing;
    an adsorbent media chamber positioned above the rack and in fluid communication with the settling chamber through the rack;
    wherein the rack separates the settling chamber from the adsorbent media chamber;
    a filtration media layer positioned in the adsorbent media chamber and on top of the rack;
    an adsorbing media layer positioned in the adsorbent media chamber and on top of the filtration media layer; and
    an effluent pipe through which fluid filtered by the absorbing media layer flows out of the housing;
  directing a fluid into the influent pipe;
  directing fluid from the influent pipe into the settling chamber via the influent chamber;
  directing fluid from the settling chamber upwardly through the rack;
  directing fluid from the rack upwardly through the filtration media layer;
  directing fluid from the filtration media layer upwardly through the absorbing media layer;
  directing fluid from the absorbing media layer into the effluent pipe; and
  directing fluid from the effluent pipe out of the filtering system.

21. The method of claim 20, wherein the adsorbing media layer is comprised of phosphorus-adsorbing media for adsorbing phosphorus.

22. The method of claim 21, wherein the phosphorus-adsorbing media is activated alumina, activated carbon, ceramic particulate media, or combinations thereof.

23. The method of claim 22, further comprising coating the phosphorus-adsorbing media with aluminum sulfate.

24. The method of claim 23, wherein coating the phosphorus-adsorbing media with aluminum sulfate includes:
  preparing a solution by dissolving aluminum sulfate in water;
  treating the phosphorus-adsorbing media in the solution;
  removing the phosphorus-adsorbing media from the solution; and
  drying the phosphorus-adsorbing media.

25. The method of claim 22, further comprising holding solids filtered from the fluid stream in the settling chamber.

26. The method of claim 25, further comprising:
  monitoring the settling chamber for an accumulation of solids filtered from the fluid stream; and
  removing the accumulated solids from the settling chamber.

27. The method of claim 26, further comprising flowing a cleaning agent through the phosphorus-adsorbing media.

28. The method of claim 27, where the cleaning agent is water.

29. The method of claim 20, wherein the fluid stream enters the influent pipe under the force of gravity.

30. The method of claim 29, wherein the fluid stream flows out of the housing through the effluent pipe under a hydrostatic force caused by the fluid stream flowing into the effluent pipe under the force of gravity.

31. The method of claim 20, wherein the fluid stream flows vertically upwardly though the filtering media layer prior to flowing out of the effluent pipe.

* * * * *